US006981088B2

(12) United States Patent
Holm et al.

(10) Patent No.: US 6,981,088 B2
(45) Date of Patent: Dec. 27, 2005

(54) SYSTEM AND METHOD OF TRANSFERRING DATA WORDS BETWEEN MASTER AND SLAVE DEVICES

(75) Inventors: Jeffrey J. Holm, Eden Prairie, MN (US); Scott T. McCormick, Costa Mesa, CA (US)

(73) Assignee: LSI Logic Corporation, Milpitas, CA (US)

( * ) Notice: Subject to any disclaimer, the term of this patent is extended or adjusted under 35 U.S.C. 154(b) by 177 days.

(21) Appl. No.: 10/397,488

(22) Filed: Mar. 26, 2003

(65) Prior Publication Data

US 2004/0205267 A1 Oct. 14, 2004

(51) Int. Cl.[7] ......................... G06F 13/00; G06F 13/28

(52) U.S. Cl. .......................... 710/306; 710/33; 710/35; 710/110; 370/464

(58) Field of Search ........................... 710/306, 33, 35, 710/110, 106, 1, 65; 709/200, 208, 236, 231, 709/232; 370/464, 235, 428, 282

(56) References Cited

U.S. PATENT DOCUMENTS 5,566,304 A * 10/1996 Regal ......................... 710/105
5,893,917 A * 4/1999 Derr ........................... 711/105
6,205,153 B1 * 3/2001 Shaffer et al. .............. 370/445
6,233,656 B1 * 5/2001 Jones et al. ................. 711/137
6,618,790 B1 * 9/2003 Talreja et al. ............... 711/105

OTHER PUBLICATIONS

"A 220-mm,four- and eight bank, 256-Mb SDRAM with single-sided stitched WL architecture" by Kirihata et al. (abstract only) Publication Date: Nov. 1998.*

"AMBA™ Specification (Rev. 2.0)", ARM Limited, Cambridge, England, Chapters 3 and 4, pp. ii-vi, 3-1,—3-58 and 4-1—74 (May 13, 1999).

"Multi-layer AHB Overview", ARM Limited, Cambridge, England, pp. 2-122 (2001).

* cited by examiner

*Primary Examiner*—Gopal C. Ray
(74) *Attorney, Agent, or Firm*—Westman, Champlin & Kelly, P.A.

(57) ABSTRACT

A data bus bridge circuit and method are provided for coupling a slave device with a data bus in a system in which data words are transferred between a master device and the slave device over the data bus. The bridge circuit removes master-induced stalls of burst transfers by converting those burst transfers into a plurality of separate, independent sub-bursts.

17 Claims, 6 Drawing Sheets

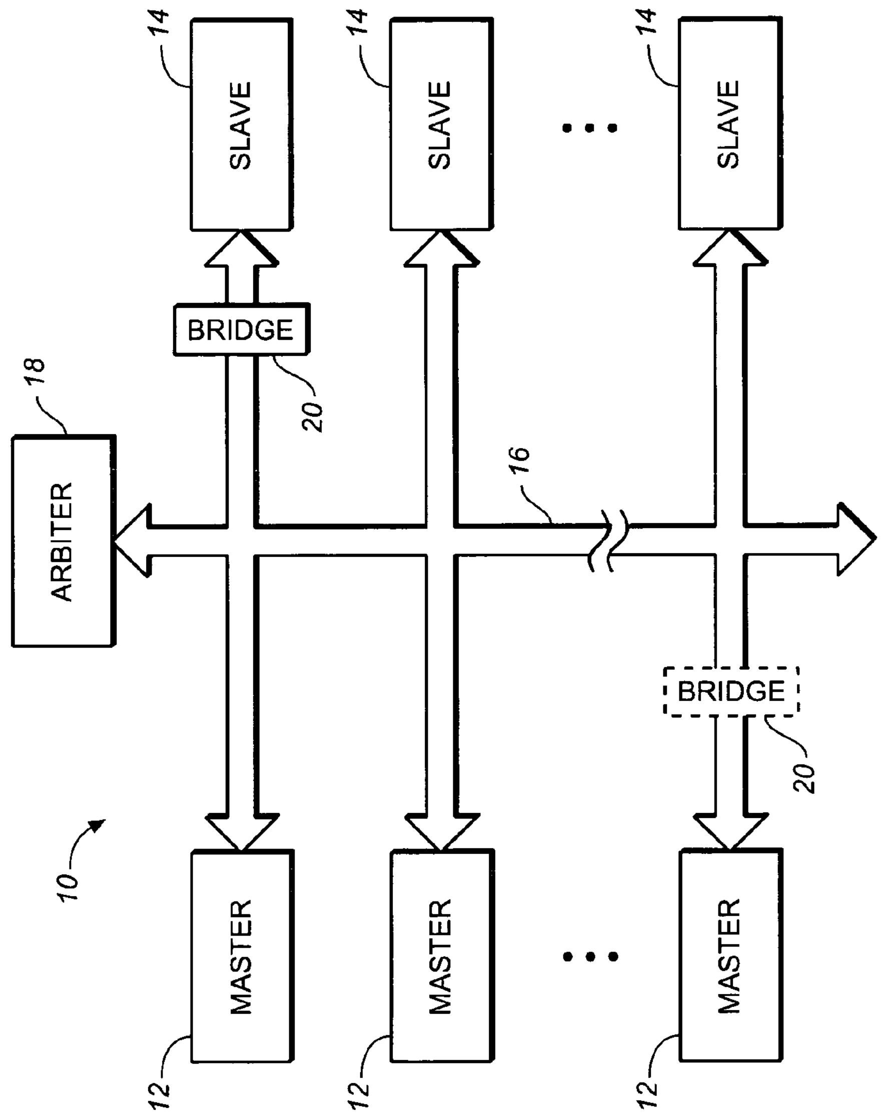
FIG._1

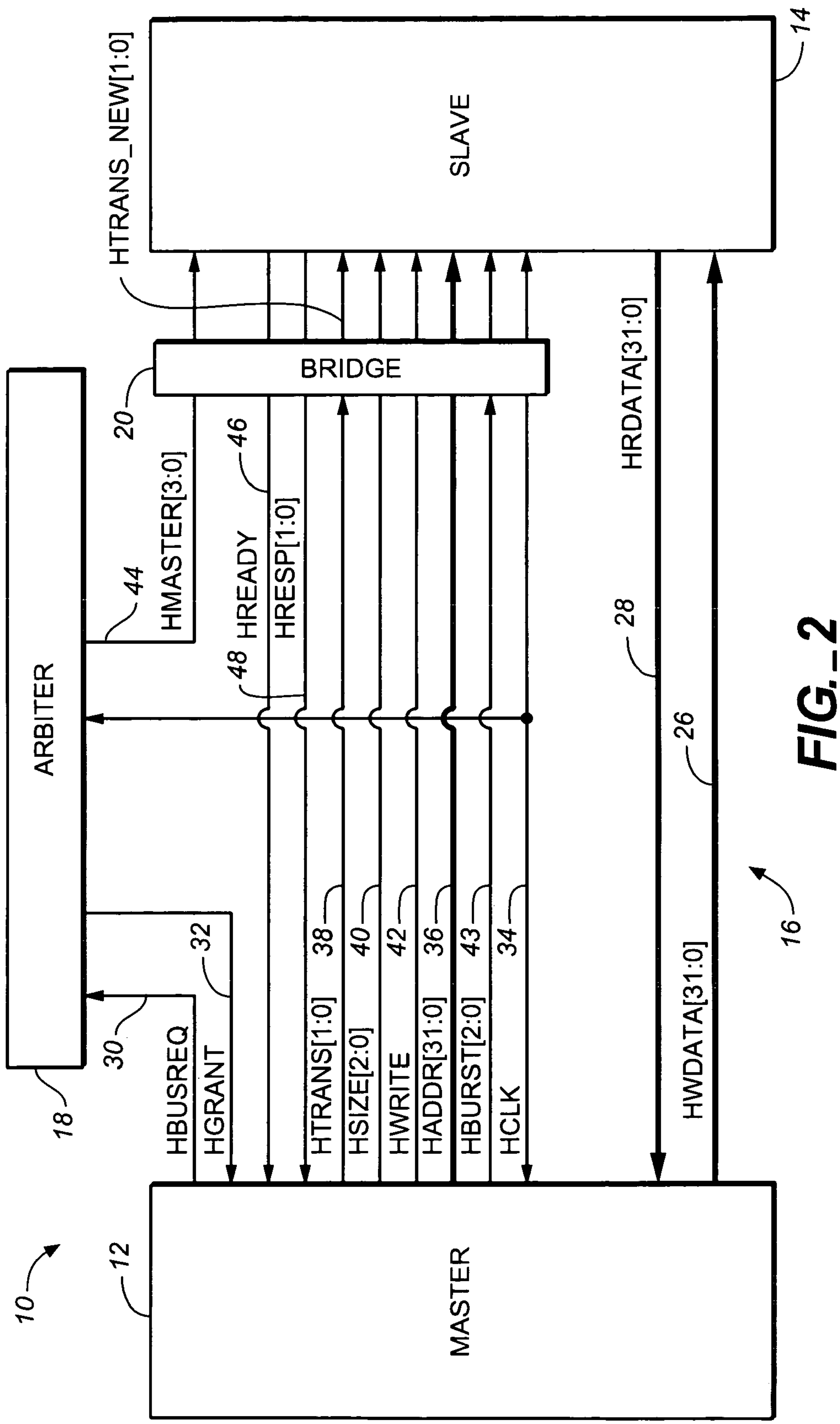
FIG._2

| HBURST[2:0] | TYPE | DESCRIPTION |
|---|---|---|
| 000 | SINGLE | SINGLE TRANSFER |
| 001 | INCR | INCREMENTING BURST OF UNSPECIFIED LENGTH |
| 010 | WRAP4 | 4-BEAT WRAPPING BURST |
| 011 | INCR4 | 4-BEAT INCREMENTING BURST |
| 100 | WRAP8 | 8-BEAT WRAPPING BURST |
| 101 | INCR8 | 8-BEAT INCREMENTING BURST |
| 110 | WRAP16 | 16-BEAT WRAPPING BURST |
| 111 | INCR16 | 16-BEAT INCREMENTING BURST |

FIG._3

| HTRANS[1:0] | TYPE | DESCRIPTION |
|---|---|---|
| 00 | IDLE | NO DATA TRANSFER IS REQUIRED. |
| 01 | BUSY | MASTER DEVICE IS CONTINUING WITH A BURST OF TRANSFERS, BUT THE NEXT TRANSFER CANNOT TAKE PLACE IMMEDIATELY. |
| 10 | NONSEQ | USED FOR THE FIRST TRANSFER OF A BURST OR A SINGLE TRANSFER. |
| 11 | SEQ | USED FOR THE REMAINING TRANSFERS IN A BURST, WHICH ARE SEQUENTIAL SUCH THAT THE ADDRESS IS RELATED TO THE PREVIOUS TRANSFER. |

FIG._4

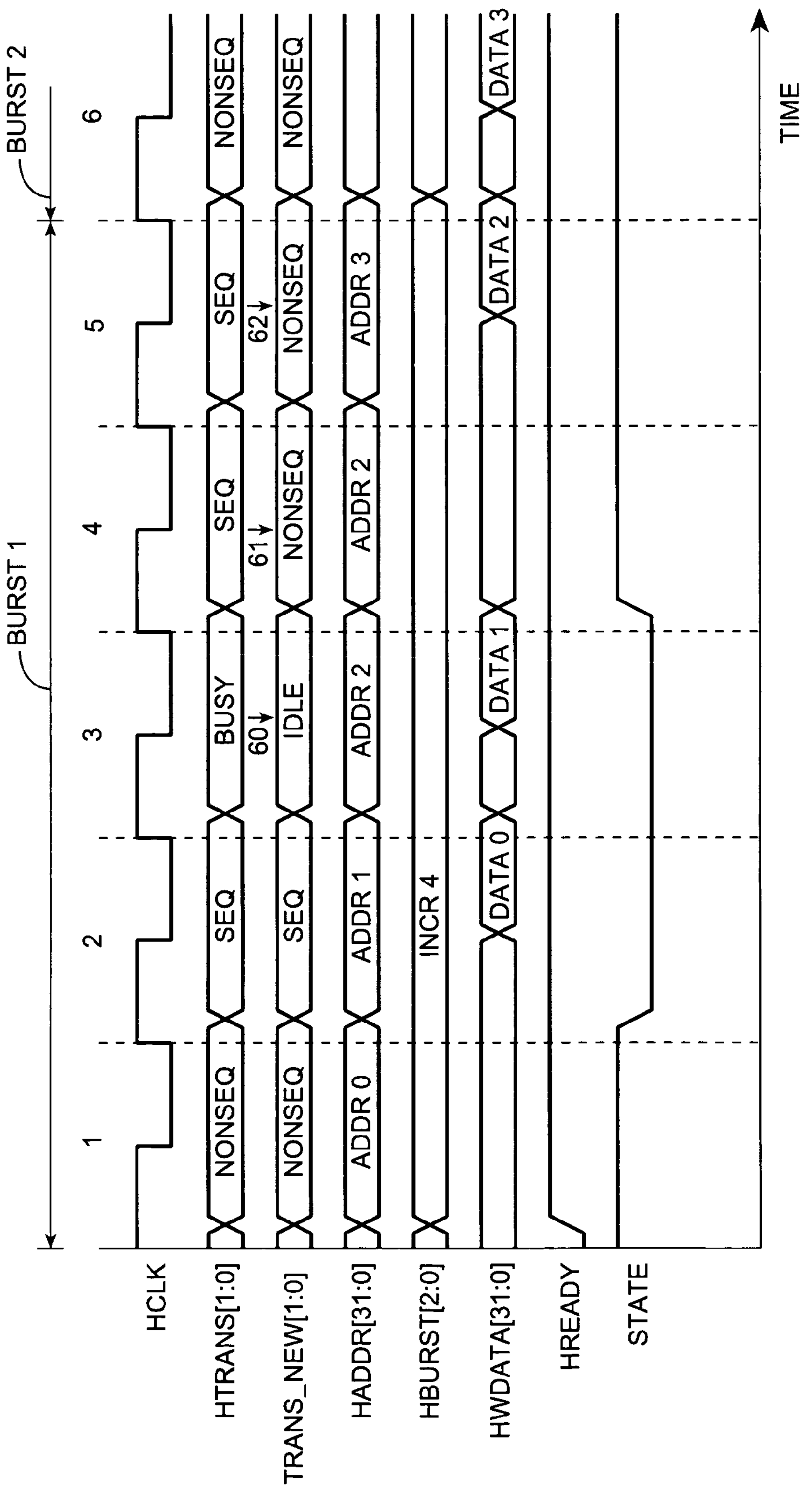
*FIG._5*

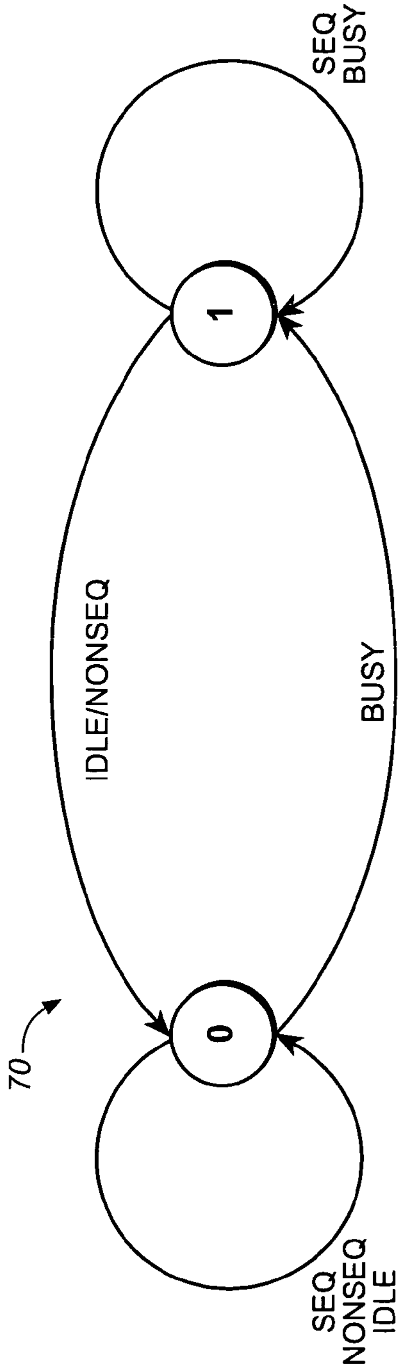
FIG._6
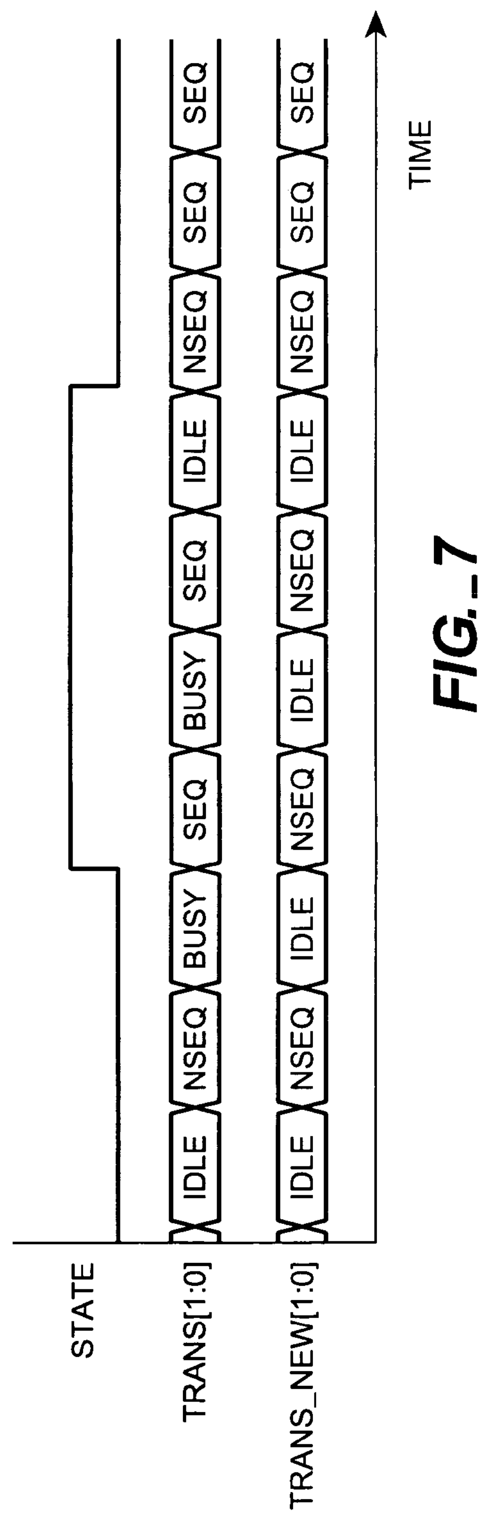
FIG._7

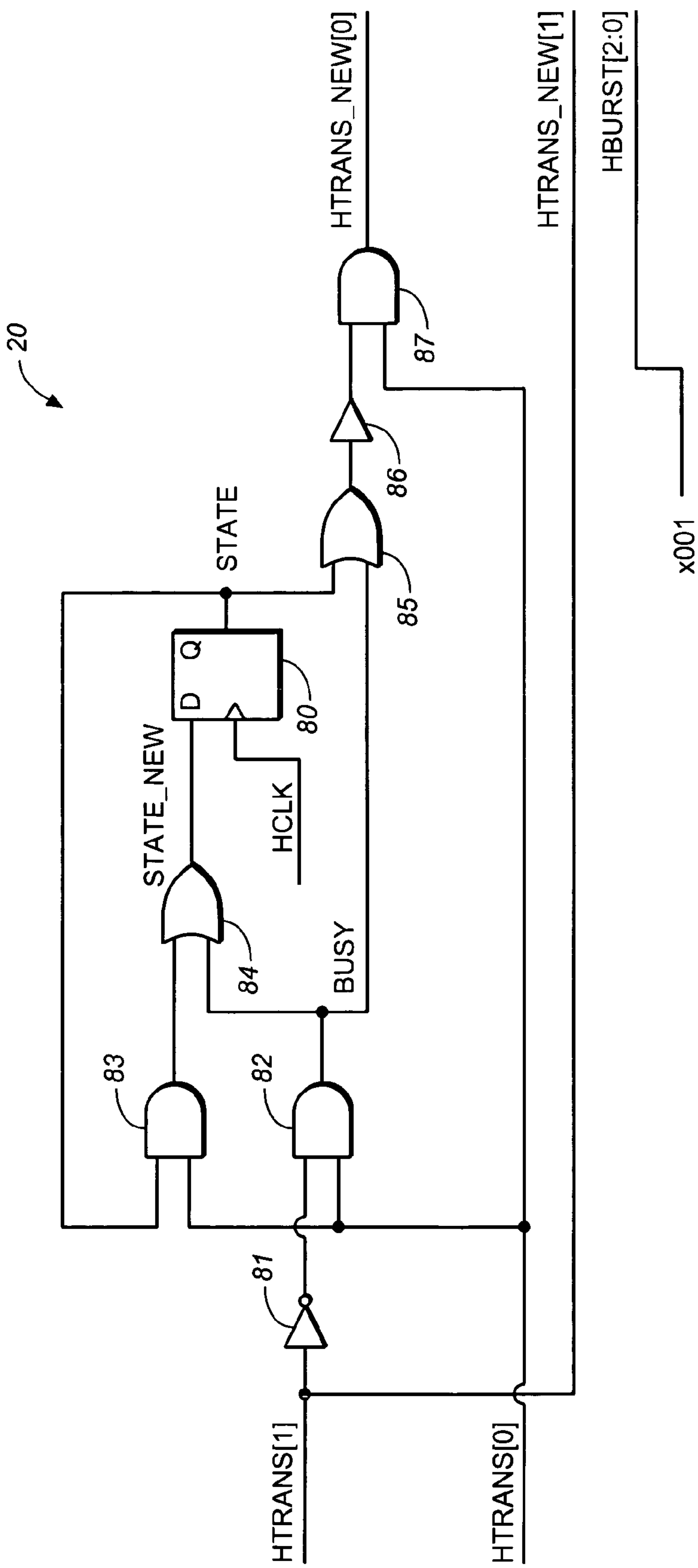
FIG._8

SYSTEM AND METHOD OF TRANSFERRING DATA WORDS BETWEEN MASTER AND SLAVE DEVICES

FIELD OF THE INVENTION

This invention relates to data buses, and more particularly to controls for data buses used in integrated circuits.

BACKGROUND OF THE INVENTION

Data buses are used in integrated circuits (ICs) to transfer data between master devices, such as user-controlled microprocessors, and slave devices that control peripheral devices, such as memories or the like. To avoid overlapping data messages that may lead to error in data transmission between the master and slave devices, it is common to employ an arbiter to arbitrate message traffic on the bus. One such bus design is an Advanced High-performance Bus (AHB) from ARM Limited of Cambridge, England. The AHB bus design is a form of an Advanced Microcontroller Bus Architecture (AMBA). The AHB bus provides high performance, high clock frequency data transfer between multiple bus master devices and multiple bus slave devices through use of an arbiter. The AHB bus is particularly useful in integrated circuits, including single-chip processors, to couple the processors to on-chip memories and to off-chip external memory interfaces.

Many bus designs, including the AHB bus, are capable of single data word transfers and bursts of multiple data words between the master and slave devices. Each data transfer includes an address and control cycle, which is followed by one or more data cycles. During the address and control cycle, the master device transmits the address for the next data transfer and control signals providing information such as the transfer type, the direction of the transfer (read or write), the size of the transfer, whether the transfer is a single transfer or a burst of multiple transfers. In the case of a burst, the control signals indicate the type of burst. For example in the AMBA AHB bus, several types of burst can be specified such as 4, 8 and 16-beat bursts and bursts of unspecified length.

In some bus designs, the master device can selectively stall transfers in the middle of a burst if the master device is not ready for further transfers. For example on an AHB bus, a master device can initiate a "BUSY" transfer type in the middle of a burst to insert one or more idle cycles during the burst. The BUSY transfer type is sent to the slave device to indicate that the master device is continuing with a burst of transfers, but the next transfer cannot take place immediately. In response to a BUSY transfer type, the slave device must stall subsequent transfers of data words in the burst until the master device is ready to continue with further transfers.

These operations are handled by interface circuitry in the slave device, which is configured to implement the bus protocol. These interface circuits can become very complex and difficult to design, particularly for complex protocols and operations such as master-induced stalls in the middle of burst-type transfers. Although simplified protocols exist for many bus designs, including an AHB-LITE protocol that implements a subset of the full AHB bus protocol, these simplified protocols have not reduced the difficulty of implementing master-induced stalls during burst-type transfers.

Simplified interface circuits are therefore desired that are capable of maintaining full compliance with the bus protocol but reduce the complexity in accommodating master-induced stalls during burst-type transfers.

SUMMARY OF THE INVENTION

One embodiment of the present invention is directed to a bridge circuit for coupling a slave device with a data bus in a system in which data words are transferred between a master device and the slave device over the data bus. The bridge circuit removes master-induced stalls of burst transfers by converting those burst transfers into a plurality of separate, independent sub-bursts.

Another embodiment of the present invention is directed to a process of transferring data words between a master device and a slave device over a data bus. The process includes: (a) initiating a burst type transfer command over the data bus for transferring multiple data words in a burst; (b) successively transferring individual ones of the multiple data words in the burst between the master device and the slave device in response to the burst type transfer command; (c) selectively inducing a stall of further transfers within the burst during step (b) by the master device; and (d) in response to step (c), dividing the burst into a plurality of separate, independent sub-bursts, wherein each sub-burst includes at least one of the data words in the burst.

Another embodiment of the present invention is directed to a data bus bridge for coupling to a data bus between a master device and a slave device in a system in which data words are transferred between a master device and the slave device in a burst over the data bus. The bridge includes a circuit for receiving a stall command for the burst from the master device and for dividing the burst into a plurality of separate, independent sub-bursts, in response to the stall command.

Yet another embodiment of the present invention is directed to a bridge circuit for coupling between a first data bus and a simplified, second data bus. The first and second data buses include a data field, an address field, and a transfer type field. The transfer type field of the first data bus identifies one of the following transfer types: (a) a non-sequential transfer type used for single data word transfers and for a first of a plurality of successive data word transfers in a burst; (b) a sequential transfer type used for all subsequent transfers in the burst; (c) a busy transfer type indicating the burst transfer is continuing on the first bus, but a next transfer in the burst is stalled; and (d) an idle transfer type indicating no transfers are required over the first bus. The bridge circuit further includes a transfer type conversion circuit and a modified transfer type output, which is coupled to the transfer type field of the second data bus. The conversion circuit replaces any of the busy transfer types received on the transfer type input with the idle transfer type on the modified transfer type output.

BRIEF DESCRIPTION OF THE DRAWINGS

FIG. 1 is a block diagram, which illustrates an example of an integrated circuit data bus system according to one embodiment of the present invention.

FIG. 2 is a block diagram illustrating in greater detail portions of the bus system shown in FIG. 1 according to one embodiment of the present invention.

FIG. 3 is a table showing a possible encoding pattern for a burst type field, HBURST, in the bus system shown in FIGS. 1 and 2.

FIG. 4 is a table showing a possible encoding pattern for a transfer type field, HTRANS, in the bus system shown in FIGS. 1 and 2.

FIG. 5 is a waveform diagram, which illustrates the operation of a bridge circuit within the bus system shown in FIGS. 1 and 2.

FIG. 6 is a diagram of a state machine, which is implemented within the bridge circuit.

FIG. 7 is a waveform diagram illustrating the transitions of states in the sate machine after receipt of a "BUSY" transfer type, and the selective conversion of "SEQ" transfer types to "NONSEQ" transfer types.

FIG. 8 is a schematic diagram of the bridge circuit, according to one embodiment of the present invention.

DETAILED DESCRIPTION OF ILLUSTRATIVE EMBODIMENTS

FIG. 1 is a block diagram, which illustrates an example of an integrated circuit data bus system 10 according to one embodiment of the present invention. System 10 includes one or more master devices 12 coupled to one or more slave devices 14 over a data bus 16. Any type of data bus that allows burst-types of transfers can be used. In one embodiment, data bus 16 implements an Advanced High-performance Bus (AHB) type, Advanced Microcontroller Bus Architecture (AMBA) from ARM Limited of Cambridge, England. A more detailed description of the AHB bus can be found in *AMBA Specification* published by ARM Limited of Cambridge, England (1999), and particularly Chapter 3 thereof, which is incorporated herein by reference. This type of bus provides high performance, high clock frequency transfer between master devices 12 and slave devices 14. Any one of the master devices 12 can initiate a data transfer with any one of the slave devices 14 over bus 16. Bus 16 can accommodate single transfers of data or bursts of multiple transfers of data.

In the example illustrated in FIG. 1, data transfer operations between the master and slave devices are arbitrated by an arbiter 18. Arbiter 18 ensures that only one master device 12 is allowed to initiate data transfers at a given time. Arbiter 18 operates in accordance with any suitable arbitration protocol. For example, arbiter 18 can establish a priority among the master devices 12, such as by an assigned rank or an allocation scheme based on usage. In alternative embodiments, bus 16 can be arbitrated in other ways, such as with a tri-state control or an interconnect switch matrix, as described in *Multi-Layer AHB, Overview*, published by ARM Limited of Cambridge, England (2001).

One feature of the data bus system 10 illustrated in FIG. 1 is the ability of certain slave devices 14 to accommodate master device-initiated stalls during burst types of data transfers without requiring complex interface circuitry. In certain bus protocols, a master device 12 can initiate a stall during a burst type of data transfer if the master device is not ready to perform the next transfer in the burst. Normally, each slave device 14 would require complex interface circuitry that is capable of stalling burst transfers in a manner that fully complies with the bus protocol.

With the present invention, one or more of the slave devices 14 can include a bridge circuit 20 that allows a non-compliant slave interface circuit to become compliant with the bus protocol without the need for complex circuitry. Upon receiving a master-initiated stall during a burst transfer, bridge circuit 20 converts subsequent transfers of data in that burst into one or more separate, independent bursts. For example, all remaining transfers in the stalled burst are converted into single transfers (bursts of single data words). This allows the slave device 14 to remove the complexity of implementing such stalls while maintaining full compliance with the bus protocol. A data word can include any number of bits in alternative embodiments of the present invention, and the size of each data word can depend on the width of the bus.

In an alternative embodiment, bridge 20 can be coupled to the outputs of one of more master devices 12, which are capable of inducing stalls during burst transfers, as shown in phantom in FIG. 1. This embodiment could be used to prevent all slave devices 14 from having to accommodate master-induced stalls during burst transfers. In many systems, only one master device is capable of inducing such stalls.

FIG. 2 is a diagram, which illustrates a portion of data bus system 10 in greater detail, according to one embodiment of the present invention. For simplicity, not all signals in bus 16 are shown in FIG. 2. Any remaining signals can be found in the AHB bus specification discussed above. For simplicity, only one master device 12 and slave device 14 are shown. Other devices can be coupled to bus 16 as shown in FIG. 1 and have selective access to the bus by arbiter 18, for example. Again, any type of selective access can be used, such as arbiter 18, a switch matrix or tri-state circuitry.

In the embodiment shown in FIG. 2, when a master device 12 seeks access to data bus 16, the master device transmits a bus request signal HBUSREQ (line 30) to arbiter 18. Arbiter 18 responds to the request in an order established by its protocol to issue a bus grant signal HGRANT (line 32) to the requesting master device 12. If, for example, there are sixteen master devices 12, there will be sixteen bus request lines 30 on which each respective master device 12 requests access, and there will be sixteen grant lines 32 on which access is granted. The arbiter protocol grants access to one master device 12 at a time.

A write data bus HWDATA (line 26) is used to transfer data from a master device 12 to a slave device 14. A read data bus HRDATA (line 28) is used to transfer data from slave device 14 to master device 12. All transfers are synchronized with a clock signal HCLK (line 34). When access is granted to a master device 12, the master device initiates a transfer by driving an address on address bus HADDR (line 36) and appropriate control signals or commands on transfer type output HTRANS (line 38), transfer size output HSIZE (line 40), transfer direction output HWRITE (line 42), and burst type output HBURST (line 43). Other control signals can also be used.

In one embodiment, address bus HADDR is 32 bits wide and represents the address in a slave device or peripheral where the next data transfer is to be read or written. The transfer size output HSIZE is 3 bits wide, for example, and represents the size of the transfer in bits. The transfer direction output HWRITE has a single bit and represents whether the master device is requesting a read or a write operation.

The burst type output HBURST indicates whether the transfer is a single transfer or part of a burst of multiple data words. In the case of a multiple word burst, HBURST can indicate whether the burst is an incrementing burst or wrapping burst and the length of the burst. FIG. 3 is a table showing one possible encoding pattern for HBURST. Other encoding patterns can also be used.

The transfer type output HTRANS is a 2-bit code, for example, which identifies the type of transfer that will occur in the next clock cycle. For example, the transfer types can include IDLE, BUSY, SEQUENTIAL (SEQ), and NON-SEQUENTIAL (NONSEQ) transfer types. FIG. 4 is a table showing one possible encoding pattern for HTRANS. Again, other encoding patterns can also be used.

The IDLE type of transfer indicates that no data transfer is required in the next cycle. The IDLE signal is initiated by master device 12 when the master device is granted access to the bus, but does not wish to perform a data transfer. The BUSY transfer type allows master device 12 to insert an IDLE cycle between successive transfers in a particular burst. The BUSY signal indicates that master device 12 is continuing with a burst of transfers, but the next transfer cannot take place immediately. When master device 12 issues the BUSY signal, the address and control signals issued with the transfer type indicate the next transfer in the burst. In response, slave device 14 stalls the next transfer of data within the burst.

The NONSEQ transfer type indicates that the next data transfer is the first transfer of a burst or is a single transfer. With a NONSEQ transfer type, the address and control signals are unrelated to and independent of the previous transfer. Single transfers are treated as bursts of one data word and therefore carry the NONSEQ transfer type.

The SEQ transfer type is used for the remaining transfers in a burst since they are sequential, and the associated address and control signals are related to the previous transfer. For example, the address HADDR can be incremented by an appropriate amount with each transfer in the burst. The remaining control signals can be identical to that provided in the previous transfer.

During each burst, arbiter 18 supplies a master identification code, or tag, HMASTER (line 44), which identifies the master device 12 that is using the bus. This code is sent to all of the slave devices 14. In the case of a system with sixteen master devices 12, the master identification code is a 4-bit code representing the individual master device.

Each master transaction generates a response from one of the slave devices 12, namely the slave device containing the address where the data is to be read or written. In one embodiment, the response includes a 1-bit ready signal HREADY and a 2-bit response signal HRESP. The HREADY signal indicates the slave device is ready to perform the transfer. The HRESP signal represents the status of the transfer, such as OKAY, ERROR, RETRY or SPLIT. The OKAY response indicates that the previous transfer has completed. For example, the write command and data transfer were accepted by the slave device or the read data is available on read data bus HRDATA (line bus 28). The ERROR response indicates an error has occurred. The RETRY response indicates the transfer did not complete, and master station 12 should retry the transfer. The SPLIT response indicates the master device should retry the transfer the next time that master device is granted access to the bus. The HREADY signal can be used by slave device 14 in connection with the HRESP signals to selectively insert wait states on the bus to allow additional cycles for a particular transaction.

Upon receipt of a command from master device 12, slave device 14 records the master identification code HMASTER in a master ID queue. If slave device 14 decides it will handle the transaction, it issues an OKAY response on HRESP bus 48. If the command is a write command, or if it is a read command and the read data is available on HRDATA bus 28, the slave device also asserts HREADY signal 46 and the transaction is completed. Otherwise, the slave device de-asserts the HREADY signal 46 to insert a wait cycle in the transaction. When read data becomes available on HRDATA bus 28, slave device 12 asserts HREADY signal 46 and the transaction is completed.

The above operations become more complex for a typical slave device when the master device initiates a BUSY signal in the middle of transfers in a burst. Bridge circuit 20 simplifies these operations in the slave device by removing the BUSY signals from HTRANS (line 38) and replacing them with IDLE signals to form a modified transfer type HTRANS_NEW, which is passed to the slave device. As discussed in more detail below, this has the effect of splitting the burst into two or more independent, sub-bursts of one or more data words each. The data words that were transferred prior to the BUSY signal form a first sub-burst, and the data words that are transferred after the BUSY signal form one or more additional sub-bursts. These sub-bursts can be independent single transfers or burst of multiple transfers.

In the example described above with reference to FIG. 4, the bus protocol requires the first transfer of a new burst (or any single transfer) to have the NONSEQ transfer type. Therefore, the remaining transfers in a burst that follow a BUSY signal are converted from the SEQ transfer type on HTRANS to the NONSEQ transfer type on HTRANS_NEW. In an alternative embodiment, the remaining transfers (that follow the BUSY signal) in the original burst are transmitted as a multiple-transfer sub-burst. In this embodiment, the first transfer of the sub-burst will have the NONSEQ transfer type and all remaining transfers of the sub-burst will have the SEQ transfer type.

In either case, the bus protocol is maintained even though the BUSY signals have been removed. In this manner, the interface circuit in the slave device does not require the complex operations that would otherwise be required to accommodate a master-induced BUSY signal.

FIG. 5 is a waveform diagram, which illustrates the operation of bridge circuit 20 in removing a BUSY transfer type signal. Each cycle of HCLK is labeled with a number 1, 2, 3, etc. to indicate the respective cycle. In the example shown in FIG. 5, the master device initiates a write transfer of a 4-beat incrementing burst (labeled "BURST 1") for writing four data words (DATA0, DATA1, DATA2 and DATA3 over HWDATA) to successive addresses (ADDR0, ADDR1, ADDR2 and ADDR3) in the slave device. The data words are passed over the write data bus, HWDATA[31:0]. The addressed are passed over the address bus HADDR[31:0].

Since BURST 1 is a 4-beat incrementing burst, the burst type HBURST[2:0] has a pattern indicating "INCR4". The address and control phase of the first transfer begins in the first cycle of HCLK in FIG. 5. Since this is the first transfer of BURST 1, the transfer type HTRANS[1:0] is non-sequential, "NONSEQ", which indicates this transfer is unrelated to or non-sequential with the previous transfer. The master device provides the corresponding address, ADDR0, of the first transfer on HADDR[31:0].

Since the slave device is ready for the transfer, HREADY=1, and the master device transmits the first data word, DATA0 on HWDATA[31:0] during the second cycle of HCLK. The address and control phase of the second transfer in BURST 1 begins during the second cycle of HCLK. In this cycle, the master device sets HTRANS[1:0] to "SEQ" since this transfer is sequential with the previous transfer and provides the next address ADDR1 on HADDR [31:0]. The second data word, DATA1, is transferred during the third cycle of HCLK in FIG. 5.

The address and control phase of the third transfer would normally begin in the third cycle of HCLK. As before, the master device supplies the next address ADDR2 on HADDR [31:0]. However in this example, the master device initiates a BUSY transfer type on HTRANS[1:0] since it cannot perform the next data transfer during the next clock cycle. In the fourth clock cycle, the master device becomes ready to begin the address and control phase of the next transfer, and sets HTRANS[1:0] to "SEQ" and again provides the next address ADDR2 on HADDR[31:0]. The master device transmits the third data word, DATA2, during the fifth cycle of HCLK. For the final transfer of BURST 1, the master device again sets HTRANS[1:0] to "SEQ" and supplies the last address, ADDR3, on HADDR[31:0] during the fifth clock cycle. The master device transmits the last data word, DATA3, during the sixth clock cycle.

Bridge circuit 20 receives the original transfer type HTRANS[1:0] from the master device. In order to simplify the command, bridge circuit 20 selectively modifies the transfer type to generate a new type HTRANS_NEW[1:0] that is passed to the slave device. If bridge circuit 20 receives a BUSY transfer type on HTRANS[1:0], the bridge circuit converts the transfer type into an IDLE type as shown by arrow 60. For the remainder of the burst, bridge circuit 20 also converts each subsequent "SEQ" type into a "NON-SEQ" type, as shown by arrows 61 and 62.

Inserting an IDLE transfer type in the middle of BURST 1 has the effect of splitting the burst into two or more sub-bursts, with each sub-burst having one or more transfers. In this example, the first sub-burst terminates after the first two data transfers, DATA0 and DATA1, in response to the "IDLE" transfer type presented on HTRANS_NEW[1:0], and all subsequent transfers in BURST 1 are treated as single transfers. The address and control phase of the next sub-burst following the IDLE cycle (e.g., a single transfer) begins as a new independent transfer during the fourth clock cycle. In order to comply with the bus protocol, the transfer type of the first transfer of an independent burst is converted to "NONSEQ". The third and fourth data words DATA2 and DATA3 are converted into independent, single transfers.

In an alternative embodiment, bridge circuit 20 converts only the next subsequent "SEQ" transfer type following a BUSY transfer into a NONSEQ type and leaves the remaining transfer types of that burst as sequential SEQ types. In such an embodiment, the subsequent data transfers (DATA2 and DATA3) would be transferred as a 2-beat sub-burst.

In another alternative embodiment, all sequential SEQ transfer types are converted into non-sequential NONSEQ transfer types, regardless of whether a BUSY transfer type has been detected within a burst. However, this would have the effect of converting all burst transfers into single transfers, which would have a negative effect on system performance.

With the example shown above, only those burst transfers during which the master device initiates a BUSY command are divided into separate sub-burst transfers. In a typical system, a master device initiates a BUSY command relatively infrequently. Therefore, splitting these bursts into separate bursts does not have a significant negative impact on system performance, but results in a great simplification of the slave interface circuitry. This allows the slave interface circuitry to be designed to accommodate a subset of the bus protocol while maintaining full protocol compliance.

An additional effect of splitting a burst into sub-bursts is "early burst termination". In the example shown in FIG. 5, the burst type provided by the master device indicated a 4-beat burst, but the slave device received a 2-beat sub-burst, followed by two single transfers. Bus protocols often specify the action to be taken by the slave device when it encounters an early burst termination. This functionality can be simplified in one embodiment of the present invention by replacing all burst types received from the master device with "INCR" to indicate an incremental burst of unspecified length. Therefore, an early burst termination within the slave device would not occur. In one embodiment, the burst type signal HBURST[2:0 received from the master device is not used, and bridge circuit 20 generates a new burst type HBURST_NEW[2:0] having a constant bit pattern indicating the INCR burst type. In another alternative embodiment, the pattern of HBURST_NEW[2:0] is conditioned on receipt of the BUSY transfer type.

FIG. 6 is a diagram of a state machine 70, which is implemented within bridge circuit 20. State machine 70 has two states, STATE 0 and STATE 1. State machine 70 remains in STATE 0 when bridge circuit 20 receives transfer types SEQ, NSEQ and IDLE. When a BUSY transfer type is received, state machine 70 transitions to STATE 1 and remains in STATE 1 until an IDLE or NONSEQ transfer type is received. In other words, state machine 70 remains in STATE 1 until the end of the current burst. When state machine 70 is in STATE 1, bridge circuit 20 converts all SEQ transfer types on HTRANS into NONSEQ transfer types on HTRAN_NEW. State machine 70 then returns to STATE 0, and bridge circuit 20 allows SEQ transfer types to pass through from HTRANS to HTRANS_NEW.

FIG. 7 is a waveform diagram illustrating the transition of the state machine "STATE" from STATE 0 to STATE 1 after "BUSY", and the selective conversion of "SEQ" to "NON-SEQ" when STATE=STATE 1.

FIG. 8 is a schematic diagram of bridge circuit 20, according to one embodiment of the present invention. However, any suitable circuit can be used, and the circuit can be modified to suit any encoding pattern for HTRANS and HTRANS_NEW. For this example, the bit patterns shown in FIG. 3 are used for HTRANS[1:0] for indicating the particular transfer type.

State machine 70 is implemented with register 80, inverter 81, logic AND gates 82 and 83 and logic OR gate 84. Register 80 stores the current state (STATE) of the state machine. Based on the pattern formed by HTRANS[1:0], the new state, STATE_NEW, that will be latched into register 80 during the next clock cycle is determined by the following equation (where H0=HTRANS[0] and H1=HTRANS[1]:

$$(\mathrm{STATE})(H0)+(H1)'(H0)=\mathrm{STATE\_NEW}$$

STATE_NEW is high anytime the BUSY transfer type is detected (BUSY=1) or anytime STATE=1 and the transfer type is not IDLE or NONSEQ. If BUSY=0 and the transfer type is IDLE or NONSEQ, STATE_NEW becomes zero.

Bridge circuit 20 further includes logic OR gate 85, inverter 86 and logic AND gate 87 for detecting the state of BUSY and the state of state machine 70. Based on the transfer type and the current state of the state machine, bridge circuit 20 selectively modifies the least significant bit HTRANS[0] to generate HTRANS_NEW[0]. The most significant bit, HTRANS[1] passes through bridge circuit 20 unchanged. HTRANS_NEW[0] is forced to zero when HTRANS[0] is zero or when STATE=1 or BUSY=1. Therefore, if HTRANS[1:0] has the bit pattern "01" (BUSY), then HTRANS_NEW[1:0] has the pattern "00" (IDLE). If HTRANS[1:0] has the bit pattern "11" (SEQ) and if STATE=1, then HTRANS_NEW[1:0] has the pattern "10" (NONSEQ). Thus, the SEQ transfer types are only converted to NONSEQ transfer types if a BUSY has been detected during the current burst. FIG. 8 also shows HBURST being replaced with HBURST_NEW[2:0], which is tied to binary "001" to indicate an incremental burst of unspecified length.

Although the present invention has been described with reference to preferred embodiments, workers skilled in the art will recognize that changes may be made in form and detail without departing from the spirit and scope of the invention.

What is claimed is:

1. A process of transferring data words between a master device and a slave device over a data bus, the process comprising:

(a) initiating a burst type transfer command over the data bus for transferring multiple data words in a first burst;

(b) successively transferring individual ones of the multiple data words in the first burst between the master device and the slave device in response to the burst type transfer command;

(c) selectively inducing a stall of further transfers within the first burst during step (b) by the master device; and (d) in response to step (c), dividing the first burst into a plurality of separate, independent sub-bursts, wherein each independent sub-burst comprises at least one of the data words in the first burst.

2. The process of claim 1 wherein in step (d), the data words in the first burst that are transferred prior to inducing the stall in step (c) form a first sub-burst and each of the data words in the first burst that are transferred after inducing the stall in step (c) form respective, independent, single-transfer sub-bursts.

3. The process of claim 1 wherein in step (d), the data words in the first burst that are transferred prior to inducing the stall in step (c) form a first sub-burst and the data words in the first burst that are transferred after inducing the stall in step (c) form a second sub-burst.

4. The process of claim 1 wherein:

step (a) comprises transmitting a transfer type to the slave device for each transfer over the data bus, wherein the transfer type comprises a non-sequential transfer type for a first one of the transfers in the first burst and a sequential transfer type for all subsequent transfers in the first burst;

step (c) comprises transmitting at least one busy transfer type to the slave device, which indicates the master device is continuing the first burst but is stalling a next transfer in the first burst; and step (d) comprises replacing the busy transfer type with an idle transfer type indicating to the slave device that the first burst has terminated.

5. The process of claim 4 and further comprising:

(e) resuming transfers of the data words in the first burst after step (c) by resuming transmission of the sequential transfer type in step (a); and wherein step (d) further comprises replacing the sequential transfer type for the next transfer in the first burst after resuming transfers in step (e) with the non-sequential transfer type to indicate the next transfer is independent of the transfers prior to step (c).

6. The process of claim 5 wherein step (d) further comprises replacing the sequential transfer type with the non-sequential transfer type for all transfers in the first burst after resuming transfers in step (e) to indicate that each of the data words in the first burst that are transferred after resuming transfers in step (e) form respective, independent, single-transfer sub-bursts.

7. The process of claim 4 and further comprising:

(e) transmitting a burst type to the slave device for each transfer in the first burst, wherein the burst type indicates a length of the first burst; and (f) replacing the burst type that is transmitted to the slave device with a burst type that indicates a burst of unspecified length.

8. A data bus bridge for coupling to a data bus between a master device and a slave device in a system in which data words are transferred between a master device and the slave device in a burst over the data bus, the bridge comprising:

means for receiving a stall command for the burst from the master device; and means for dividing the burst into a plurality of separate, independent sub-bursts, in response to the stall command, wherein each independent sub-burst comprises at least one of the data words in the burst.

9. The data bus bridge of claim 8 wherein the means for dividing comprises means for dividing data words in the burst that are transferred after receiving the stall command into respective ones of the sub-bursts, which are independent, single-transfers.

10. The data bus bridge of claim 8 wherein the means for dividing comprises means for dividing data words in the burst that are transferred before receiving the stall command into a first one of the sub-bursts and data words in the burst that are transferred after receiving the stall command into a second one of the sub-bursts.

11. The data bus bridge of claim 8 wherein:

the means for receiving comprises means for receiving a transfer type from the master device for each transfer over the data bus, wherein the transfer type comprises a non-sequential transfer type for a first one of the transfers in the burst, a sequential transfer type for all subsequent transfers in the burst, and a busy transfer type for the stall command, which indicates the master device is continuing the burst but is stalling a next transfer in the burst; and the means for dividing comprises means for replacing the busy transfer type with an idle transfer type, which indicates that the burst has terminated.

12. The data bus bridge of claim 11 wherein:

the master device resumes transfers of the data words in the burst after transmitting the busy transfer type by resuming transmission of the sequential transfer type; and the means for dividing further comprises means for replacing the sequential transfer type for the next transfer in the burst after the master device resumes the transfers with the non-sequential transfer type to indicate the next transfer is independent of the transfers prior to receiving the busy transfer type from the master device.

13. The data bus bridge of claim 12 wherein the means for dividing further comprises means for replacing all sequential transfer types, which are received from the master device within the burst after receiving the busy transfer type, with the non-sequential transfer type.

14. The data bus bridge of claim 11 and further comprising:

means for replacing a burst type, which is transmitted with the transfer type by the master device and indicates a length of the burst, with a burst type that indicates a burst of unspecified length.

15. A bridge circuit for coupling between a first data bus and a second data bus, wherein the first and second data buses include a data portion, an address portion, and a transfer type portion, and wherein bridge circuit comprises:

a transfer type input coupled to the transfer type portion of the first data bus, which identifies one of the following transfer types: (a) a non-sequential transfer type used for single data word transfers and for a first of a plurality of successive data word transfers in a burst; (b) a sequential transfer type used for all subsequent transfers in the burst; (c) a busy transfer type indicating the burst transfer is continuing on the first bus, but a next transfer in the burst is stalled; and (d) an idle transfer type indicating no transfers are required over the first bus;

a modified transfer type output coupled to the transfer type portion of the second data bus; and a transfer type conversion circuit, which replaces any of the busy transfer types received on the transfer type input with the idle transfer type on the modified transfer type output.

16. The bridge circuit of claim 15 wherein the transfer type conversion circuit replaces any of the sequential transfer types received on the transfer type input after the busy transfer type within the burst with the non-sequential transfer type on the modified transfer type output.

17. The bridge circuit of claim 15 wherein the first and second data buses further comprise a burst type portion, which indicates a length of the burst and wherein the bridge circuit further comprises:

a burst type output, which is coupled to the burst type portion of the second data bus and has a pattern that continually indicates a burst of unspecified length.

* * * * *